United States Patent [19]
Koechner et al.

[11] 3,747,019
[45] July 17, 1973

[54] METHOD AND MEANS FOR STABILIZING THE AMPLITUDE AND REPETITION FREQUENCY OF A REPETITIVELY Q-SWITCHED LASER

[75] Inventors: Walter Koechner, Malibu; Leonard Charles Debenedictis, Los Angeles, both of Calif.

[73] Assignee: Union Carbide Corporation, New York, N.Y.

[22] Filed: July 16, 1970

[21] Appl. No.: 55,517

[52] U.S. Cl. .............................................. 331/94.5
[51] Int. Cl. ............................................... H01s 3/11
[58] Field of Search ...................... 331/94.5; 350/160

[56] References Cited
UNITED STATES PATENTS 3,521,069  7/1970  De Maria et al. ................ 331/94.5
3,633,124  1/1972  Danielmeyer ..................... 331/94.5
3,641,459  2/1972  Paoli ................................ 331/94.5

Primary Examiner—William L. Sikes
Attorney—Pastoriza & Kelly

[57] ABSTRACT

A technique for stabilizing the amplitude and repetition frequency of a repetitively Q-switched laser includes a first step or operation in which all light from each output pulse above a given amplitude level is removed to provide a series of output pulses having uniform amplitudes. A second step or operation then involves selecting a narrow time channel within the pulse width of each pulse at precise points in time to provide final output light pulses of uniform amplitude, pulse width, and repetition frequency.

6 Claims, 2 Drawing Figures

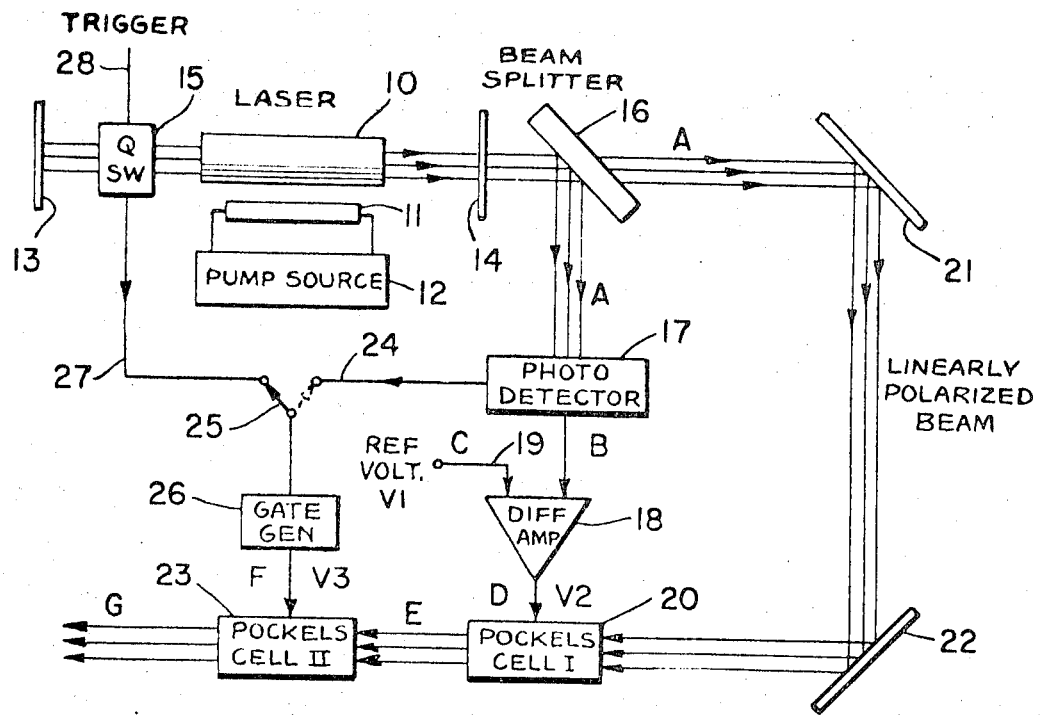
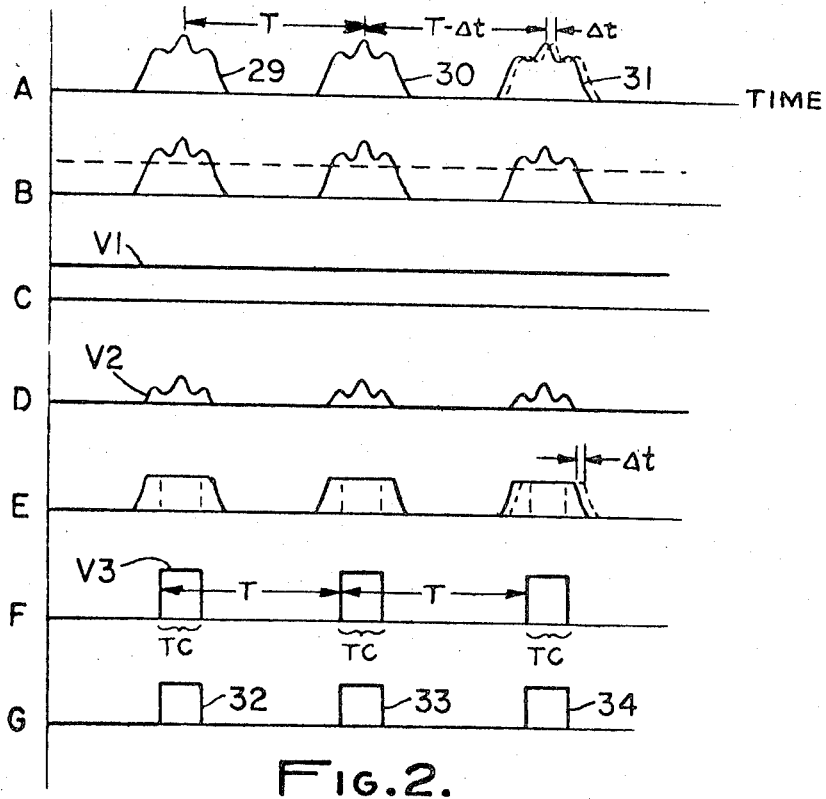

3,747,019

METHOD AND MEANS FOR STABILIZING THE AMPLITUDE AND REPETITION FREQUENCY OF A REPETITIVELY Q-SWITCHED LASER

This invention relates generally to laser systems and more particularly to an improved method and means for providing output pulses of uniform amplitude, pulse width, and repetition frequency.

BACKGROUND OF THE INVENTION

In certain applications of laser systems such as in communications, radar type ranging, data processing and so forth, it is necessary to have amplitude stability to within a few per cent and to have control of the temporal occurrence or frequency of the laser output pulses to within a few nanoseconds. The output of even well stabilized lasers now in operation has more jitter and amplitude fluctuations than these applications will allow. In addition, the shapes of the output pulses vary somewhat from pulse to pulse thereby making their application for ranging purposes useless.

BRIEF DESCRIPTION OF THE PRESENT INVENTION

The present invention comprises a method and means for essentially modulating the output pulses of a laser so as to transmit only well defined square pulses narrower in width and lower in amplitude than the unmodulated laser pulses. These pulses are all of uniform amplitude and of precise pulse width so that they satisfy the aforementioned application requirements.

Essentially, the method contemplates removing all light from each output pulse above a given amplitude level to thereby provide a series of uniform amplitude pulses. Thereafter, there is selected from each pulse a narrow time channel within the pulse width at precise points in time to provide a final output of light pulses of uniform amplitude, pulse width, and repetition frequency.

The preferred apparatus or means for carrying out the foregoing method of amplitude and frequency stability includes a first means positioned to receive the output pulses from the laser and limit the amplitude of the pulses to a given uniform amplitude. A second means is positioned to receive the uniform amplitude pulses from the first means and optically gate the pulses to pass only an intermediate portion of the pulse between its leading and trailing edges as defined by the gating signal. The means for generating the gating signal itself is connected to provide each gating signal in time synchronism with the Q-switching of the laser.

The aforementioned first and second means take the form of polarizing means such as Pockels cells controlled by suitable electrical signals to effect the desired modulation of the pulses resulting in the uniform output light pulses.

BRIEF DESCRIPTION OF THE DRAWINGS

A better understanding of the method and means of this invention will be had by referring to a preferred embodiment as illustrated in the accompanying drawings, in which:

FIG. 1 is a schematic diagram partly in block form illustrating a laser system for providing output pulses stabilized in both amplitude and frequency; and, FIG. 2 illustrates a series of wave forms appearing at various correspondingly lettered points in the diagram of FIG. 1 useful in explaining the operation of the invention.

DETAILED DESCRIPTION OF THE PREFERRED EMBODIMENT

Referring first to FIG. 1 there is schematically illustrated a typical repetitively Q-switched laser comprising a laser rod 10 pumped by a lamp 11 powered from a pump source 12. Suitable end mirrors 13 and 14 define an optical cavity for the regeneration of light radiation during transition of the lasering ions from an inverted population level resulting from light pumping to a lower energy state. The Q-switch 15, which may comprise either an electro-optical type of shutter such as a Kerr or Pockels cell or a mechanical Q-switching arrangement, spoils the Q of the optical cavity until a large inverted population level is established in the laser rod. When the Q is restored at precise points in time, a giant pulse of laser radiation results and by making the end mirror 14 partially transmissive, this light pulse can be coupled out of the system. The pulse repetition rate or frequency of the laser is determined by the frequency of Q-switching.

In accord with the invention, the output pulses from the laser are monitored by providing a beam splitter 16 which reflects a portion of the output to a photodetector 17. The output of the photodetector 17 takes the form of an electrical signal following the contour of the output light pulses. This electrical signal is passed to a first input of a differential amplifier 18. A reference voltage V1 is passed into the second input 19 of the differential amplifier, this amplifier combining the pulses to provide output electrical signals indicated by V2. These signals are utilized to control a first polarizing means which may take the form of a Pockels cell I designated 20.

The output light pulses passed through the beam splitter are delayed by a suitable delay means in the form of spaced mirrors 21 and 22, these output light pulses being directed to the Pockels cell I as shown. Normally the output beam from certain solid state lasers is linearly polarized. If such is not the case, a suitable polarizing means may be provided at the output to assure that the beam is linearly polarized. This linear polarization is necessary in order that the Pockels cell 20 can properly control the light pulses.

The output light pulses from the Pockels cell I pass through a second polarizing means which may take the form of a second Pockels cell II designated 23. Pockels cell 23 may be controlled by a signal derived from a leading edge of the electrical signals provided by the photodetector 17. This signal is passed along the line 24 and through a switch arm 25 when in its dotted line position to a gate signal generator 26. The output of the gate signal generator is indicated by the voltage signal V3 and is connected to the Pockels cell II as shown. The generation of the gating signal may be initiated by a trigger signal derived from the Q-switch 15 rather than from the photodetector 17. In this case, the switch arm 25 is thrown to its solid line position to receive a signal on line 27 in time synchronism with the trigger signal 28 for the Q-switch 15.

Referring now to FIG. 2, the various pulse and wave forms appearing at the correspondingly lettered points in FIG. 1 are illustrated. Thus, in the top wave form there are illustrated a series of light output pulses 29, 30, and 31 occurring at the pulse repetition frequency.

It is a characteristic of lasers of the type described that the output pulses may vary slightly in their generation such that while the pulse repetition frequency may be constant over long periods, the individual time separations between successive pulses may vary. This jitter or variation is indicated in FIG. 2 by the time periods $T$ and $T-\Delta t$. A successive pulse may be spaced at $T+\Delta t$ such that the overall frequency, as stated, is constant over a given length of time. The described jitter is indicated by the displacement of the solid line pulse 31 from a phantom dotted line position.

In addition to jitter occurring in the time positions of successive pulses, the pulse width of the individual pulses themselves may vary slightly resulting in a jitter in pulse width. The manner in which these jitters are removed and uniform output pulses of fixed amplitude and pulse width provided will be evident when the operation of the system is described.

The next wave form B illustrates electrical signals from the photodetector 17 of FIG. 1 and it will be noted that the contour of these electrical signals follow the amplitude contour of the light pulses.

Wave form C represents the constant reference voltage V1 passed to the differential amplifier 18 while wave form D illustrates the output from the differential amplifier which constitutes essentially a control electrical signal V2 reduced in amplitude by the amount of the fixed reference voltage V1.

Wave form E illustrates output light pulses from the Pockels cell I which pulses are all of uniform amplitudes. Wave form F illustrates the gating signals V3 from the gate signal generator 26 of FIG. 1. These square wave electrical signals are all of constant pulse width as indicated by Tc. Further, the leading edge of these pulses are generated at precise points in time in synchronism with the operation of the Q-switch when the switch arm 25 is in the solid line position shown.

Finally, the wave form G illustrates the output light pulses from the second Pockels cell II and it will be noted that these pulses 32, 33, and 34 are of uniform amplitude, pulse width, and occur at precise points corresponding to the pulse repetition frequency.

OPERATION

In operation, the laser will provide output light pulses at a given repetition frequency determined by the repetition trigger frequency for the Q-switch 15. These output light pulses are passed to the beam splitter 16 as described so that the pulses indicated by the wave form A will pass to the photodetector 17 and also to the spaced mirrors 21 and 22. The physical spacing of the mirrors is such as to provide a light path from the beam splitter 16 to the mirror 21, mirror 22 and Pockels cell 20 of sufficient length to delay the pulses a given amount corresponding to the delay involved in generating electrical control signals from the other portions of the system.

The light pulses received in the photodetector result in the generation of electrical pulses shown in wave form B of FIG. 2 following the contour of the light pulses. After these electrical pulses have been passed through the differential amplifier together with the reference voltage V1, there results the pulses V2 shown in wave form D. The electrical signals D control the degree of polarization effected by the Pockels cell I. Thus the direction of polarization of the Pockels cell is varied in accord with the contour of the electrical signals V2 in such a manner as to reflect out of the system all light above a given amplitude determined by the reference voltage V1. The output of the Pockels cell I thus represents essentially a "chopped" output light pulse as indicated by the wave form E.

Assuming that the switch arm 25 for the gate generator 26 is in the solid line position shown, the triggering of the Q-switch will initiate generation of an electrical gating signal V3 shown in wave form F. The leading edges of the pulse can be generated at precise points in time corresponding to the triggering of the Q-switch so that even though the output light pulses may not be uniformly generated as indicated by the phantom line showing for the pulse 31 in wave form A, the gating signals themselves will be at uniform precise points in time. These gating signals are passed to the second Pockels cell II and change the direction of polarization of this cell to a given direction in which light from the first Pockels cell is passed by the second Pockels cell. At the end of the fixed gating period, the polarization of the Pockels cell 23 is returned to its initial position in which radiation is blocked from passing therethrough. The final output pulses shown by wave form G are thus of uniform amplitude, pulse width, and repetition frequency.

Because the electrical gating signals are of constant width Tc any pulse width jitter is eliminated in the final output light pulses. Also, as mentioned, at precise points in time, jitter resulting from variations in the period between successive output pulses are eliminated.

As mentioned heretofore, it is also possible to initiate generation of the gating signal by utilizing the leading edge of the electrical signals from the photodetector 17. In this case, the switch arm would be in the dotted line position. This arrangement would be used in the event a mechanical Q-switch were employed in the laser cavity wherein the precise points of Q-switching in time are not as accurately determined as is the case when an acousto-optical or electro-optical triggered Q-switch is employed. Also in the event that the repetition frequency is intitally unstable such that the gate width would not be overlapped by the laser pulse, the gate is triggered from the photo-detector. While the pulse width jitter will be eliminated regardless of the position of the switch arm 25 because of the constant period electrical gating signals provided, when the gating signals are triggered by the output of the photodetector 17, some variation in pulse repetition frequency may still occur. For accurate ranging applications, it is thus preferable to utilize the Q-switch trigger for generation of the gating signals and an acoustical or electrically triggered type of Q-switch in the system.

From the foregoing description, it will be evident that the present invention has provided a method and means for stabilizing the amplitude and repetition frequency of repetitively Q-switched lasers wherein certain applications for which heretofore available lasers could not meet the requirements can now be realized.

What is claimed is:

1. A method for stabilizing the amplitude and repetition frequency of a repetitively Q-switched laser comprising the steps of:
    a. removing all light from each output pulse above a given amplitude level;
    b. selecting a narrow time channel within the pulse width of each pulse to provide output light pulses of uniform amplitude and pulse width;

c. generating a timing signal in response to the generation of pulses by the laser: and d. initiating the selecting of said narrow time channel by said timing signal so that said output pulses occur at precise points in time synchronized to the points in time that the laser is generating pulses.

2. The method of claim 1, in which light above said given amplitude level is removed by generating an electrical signal of wave form following that of each output pulse; providing a constant reference signal of value corresponding to said given amplitude level; combining the signals to provide a control signal; passing the output pulses through a first polarizing means; controlling the direction of polarization of said polarizing means by said control signal such that light above said given amplitude only is blocked from passing through said first polarizing means so that the output pulses from said first polarizing means all have uniform amplitudes, the selecting of a narrow time channel within the pulse width of each pulse being accomplished by passing the output pulses of uniform amplitudes from said first polarizing means to a second polarizing means; and changing the direction of polarization of said second polarizing means by said timing signal to a new direction for given time periods at precise points in time corresponding to the time positions of the pulses during which said pulses are passed through said second polarizing means, each of the given time periods defining the narrow time channel within the pulse width.

3. A means for stabilizing the amplitude and repetition frequency of a repetitively Q-switched laser comprising:

a. first means positioned to receive output pulses from said laser to limit the amplitude of said pulses to a given uniform amplitude;

b. second means positioned to receive the uniform amplitude pulses from said first means and optically gate said pulses to pass only an intermediate portion of the pulse between its leading and trailing edges as defined by a gating signal; and c. means connected to said second means for providing said gating signal in time synchronism with the Q-switching of said laser.

4. A repetitively Q-switched laser system for providing output pulses of uniform amplitude, pulse width and repetition frequency, comprising, in combination:

a. a laser medium;

b. pumping means for said medium;

c. end mirrors defining an optical cavity for said medium;

d. Q-switching means in said optical cavity for enabling generation of laser pulses at a given pulse repetition frequency defined by the frequency of operation of said Q-switching means;

e. means for monitoring each output pulse to provide electrical signal pulses of wave form following the amplitude contour of said output pulses;

f. means for generating a reference signal of given amplitude;

g. differential amplifier means receiving said electrical signal pulses and reference signal to provide output control signals;

h. a first polarizing means connected to receive said control signals;

i. delay means receiving the output light pulses and passing said pulses to said first polarizing means after a given time delay sufficient to assure that said output pulses arrive at said first polarizing means at the same time as said control signals, said control signals controlling the direction of polarization of said first polarizing means such that light above a given amplitude determined by said reference signal is blocked from passing through said first polarizing means so that the output pulses of said first polarizing means are all of uniform amplitudes;

j. means for generating an electrical gating signal defining a narrow time channel of constant time period less than the pulse width of the output light pulses in response to generation of each light pulse in said laser system; and k. a second polarizing means connected to receive said gating signal, said uniform amplitude pulses from said first polarizing means being passed to said second polarizing means, said gating signal changing the direction of polarization of said second polarizing means during said constant time period only to pass the light pulses through said second polarizing means whereby the output pulses from said second polarizing means are uniform in amplitude, pulse width and repetition frequency.

5. A laser system according to claim 4, in which said means for generating said gating signal is connected to said monitoring means so that generation of said gating signals is responsive to said electrical signal pulses.

6. A laser system according to claim 4, in which said means for generating said gating signal is connected to said Q-switching means so that generation of said gating signals is responsive to Q-switching of said laser.

* * * * *